Feb. 4, 1969  W. H. STOUT  3,425,633
POP-UP STANDPIPE
Filed June 23, 1967
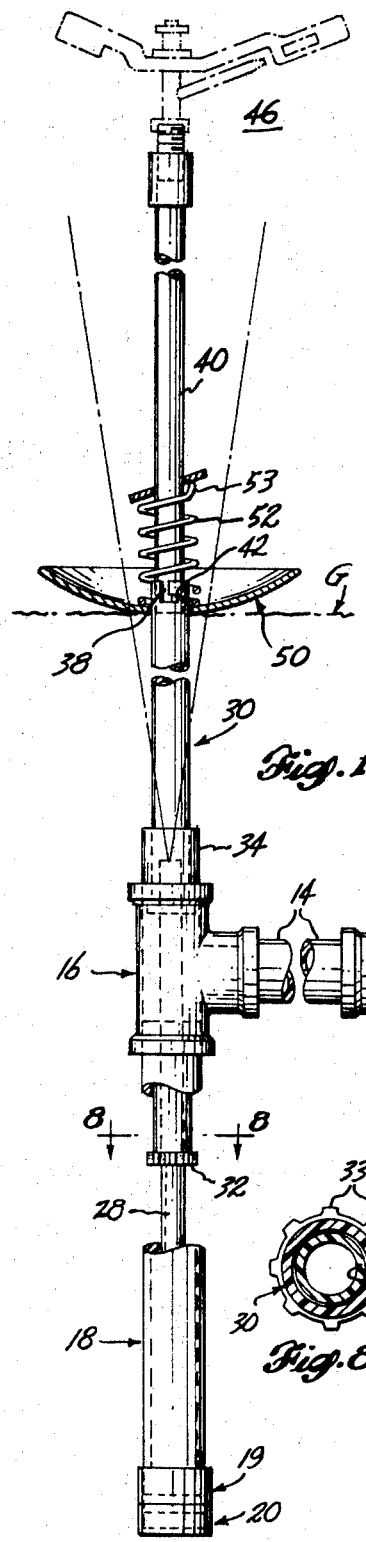
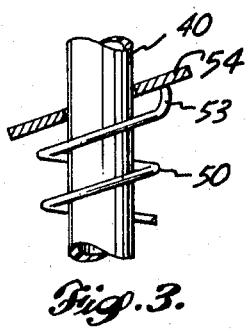
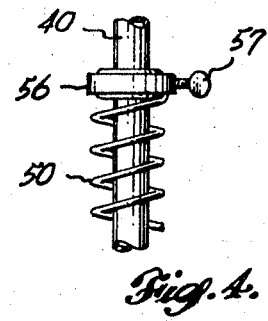
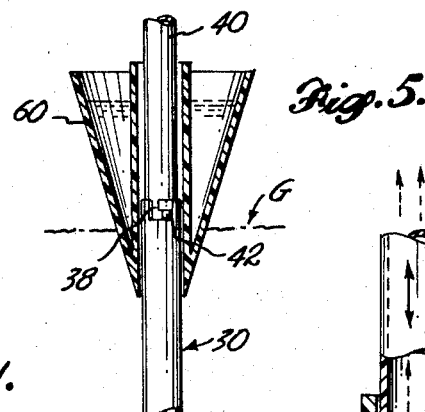
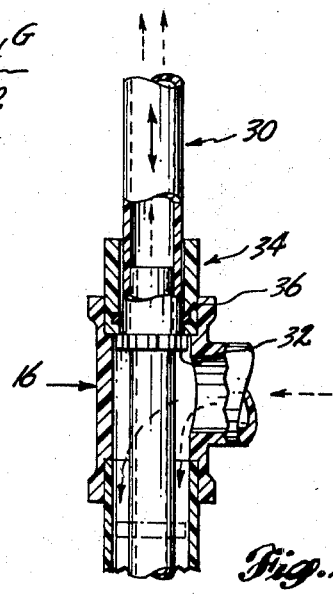
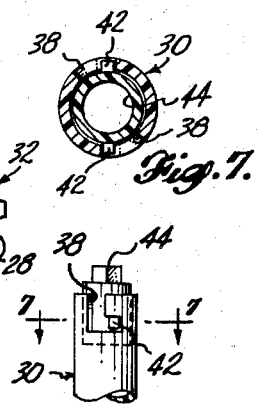
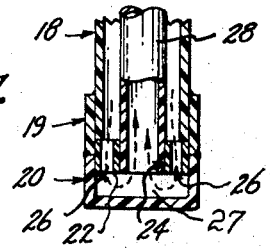
INVENTOR.
WILLIAM H. STOUT
BY Ford E. Smith
ATTORNEY

United States Patent Office 3,425,633
Patented Feb. 4, 1969

3,425,633
POP-UP STANDPIPE
William H. Stout, 223 N. Jessup, Portland, Oreg. 97217
Filed June 23, 1967, Ser. No. 648,267
U.S. Cl. 239—281                           4 Claims
Int. Cl. F16l 7/00; A01g 25/00; B05b 3/02

ABSTRACT OF THE DISCLOSURE

A standpipe is telescoped into an upright tubular chamber in which fluid, supplied near the top, passes into the standpipe only after flowing through the chamber to its bottom. The standpipe is stabilized at the ground line to insure upright disposition.

Background

This invention is particularly adaptable for use in agricultural irrigation systems where the mains are buried and the distribution standpipes are desirably stored in telescoped fashion during non-use beneath the surface of the earth. Such systems are known. However, known prior apparatus is difficult to operate and maintain due to problems arising out of the presence of fine soil or sand particles in the system. A demonstrated need for self-flushing standpipe equipment in such systems exists. Another problem arises where the standpipe is long and rises a substantial distance, say, two to six feet, above the earth. The sprinkling operation performed by a distributor at the elevated end of the standpipe is often accompanied by an excessive wetting of the normally loose soil in the immediate vicinity of the standpipe. As the distributor operates vibratory or oscillatory forces are applied to the standpipe which are often self-destructive of its connection with the member into which it may be telescoped. A real need exists for means to stabilize the standpipe at the ground line and that such means produce increasing stability as distribution takes place.

The Drawings

FIGURE 1 is an elevation view of a stabilized telescopic pop-up standpipe in partial extension, parts being broken away for convenience of illustration;

FIGURE 2 is an enlarged view in section of a sliding coupling in the standpipe assembly;

FIGURES 3 and 4 show details of the stabilizing means;

FIGURE 5 shows an alternate form of stabilizing means;

FIGURE 6 illustrates a standpipe closure plug; and

FIGURE 7 is a cross-section on line 7—7 of FIGURE 6; and

FIGURE 8 is a cross-section on line 8—8 of FIGURE 1.

Description

A main connected with a source of fluid under pressure is buried in the earth a distance beneath the ground G. It has a T 10 and lateral nipple 14 to one side. T-coupling 16 is at the head or upper end of upright tube 18 which is closed at its bottom by cap 20.

An annular plug 22 is located at the bottom of tube 18 within the supplemental collar 19 and cap 20. Plug 22 has an axial opening 24 which is surrounded by ports 26, 26 which may be arcuate.

Riser conduit 28 is fitted to plug 22 at opening 24 and rises thereabove to pass through coupling 16 as shown in FIGURES 1 and 2. Those portions of the plug 22 between openings 26, 26 constitute arms whereby the lower end of conduit 28 is supported above the bottom of chamber 27 and coaxial thereof as may be seen in FIGURE 2.

The telescopically movable standpipe 30 has a notched lower guide collar 32 which has lobes closely fitting the interior of tube 18 and the upright passage of coupling 16. Standpipe 30 telescopes over and surrounds riser 18.

A collar 34 is mounted in coupling 16 and annular seal 36 surrounds standpipe 30.

A preferred form of the invention is produced from non-metallic, plastic pipe and related coupling components. In such case parts are adhesively joined or fused by the use of solvents or adhesives. Obviously, metal tubes and coupling components fall within the invention.

The upper end of standpipe 30 has an opposed pair of bayonet slots 38 and an extension tube 40 having lugs 42 fitting slots 38 is secured in place. Or the standpipe 20 may be closed by plug 44 likewise provided with lugs 42.

A conventional intermittent rotary sprinkler 46 is indicated and shown coupled to extension 40.

In FIGURE 1 is shown a stabilizer foot 50, in this case a concavo-convex disc, which rests on the ground. Pressure downward is applied by spring 52 which bears on canted washer 54 or, alternatively, adjustable screw-secured collar 56 having thumb screw 57. Washer 54 has an aperture slightly larger than extension 40. It is canted to locking position by the spring horn 53.

In FIGURE 5 an inverted conical stabilizer 60 is shown surrounding extension 40 at the ground line G. Stabilizer 60 having tubular core 61 is hollow as shown and may be filled with earth or water to increase its weight.

As overhead sprinkling takes place the distributor 46 operates there is a tendency for the standpipe and its extension to sway and to vibrate as shown by dashed lines in FIGURE 1. As this occurs the foot 50 bearing in the earth dampens the motion. If the earth is soft or wet or both, foot 50 tends to work down to stabilize the pipe 40 and eliminate the motion. In the FIGURE 5 stabilizer 60 the pointed end tends to work down into a cavity usually caused by the swaying motion. Added weight of earth or water or the like accelerates the wedging action in stabilizer 60 as does the spring 52 with stabilizer 50.

Water entering coupling 16 flows, as indicated by arrows in FIGURE 2, downward from beneath collar 32, around tube 28 and passes through apertures 26. This creates a boiling action which tends to place or keep solid particles in suspension so that they are carried along with the stream flowing upward in tube 28. Water discharging from the upper end of tube 28 passes into tube 30 and thence to distributor 46.

During non-irrigating periods, the pipe 40 and distributor 46 are usually removed and plug 44 inserted. The standpipe 30 is then pressed downward into telescoped relation within tube 18. Thus the upper end of pipe 30 may be disposed below the ground surface to permit cultivation and planting operations. Reactivation of the system involves supplying pressurized fluid whereupon the standpipe pops up out of the ground for reuse.

In such case the entering fluid flows downward around pipe 30, past the guide collar 32, through apertures 26, 26 and the collection chamber 27, into tube 28. Pressure is then exerted upward against the plugged end of pipe 30 and the same rises out of the ground.

It will be readily apparent to those skilled in the art that changes and alterations may be devised or adopted to simplify manufacture, or improve utility of this apparatus.

What is claimed is:
1. An irrigation system comprising:
  (A) a buried main conduit connected to a source of fluid under pressure;
  (B) means forming an upright passageway having a closed bottom and an upwardly open mouth and including means for the introduction of fluid near said mouth from said main conduit, said passageway forming means extending downward relative to said main conduit;

(C) a riser conduit coaxial of said passageway mount, and means supporting the lower end of said riser conduit in spaced relation above the passageway bottom and from the passageway wall, said means being adapted to pass fluid from outside said riser conduit into its lower end;

(D) a distribution standpipe telescopically introduced into said passageway through said mouth in surrounding relation to said riser conduit, said standpipe being smaller in cross-section than said passageway whereby fluid may flow downward around its outer surface, into said riser conduit and through said standpipe, said standpipe being a length when telescopically extended upward by the fluid pressure, to at least reach the surface of the ground; and (E) means to limit upward extension of said standpipe to maintain standpipe enclosure of the upper end of said riser conduit.

2. The system according to claim 1 in which there is a downwardly urged foot member surrounding the extended standpipe at the ground surface adapted to stabilize the standpipe.

3. The system according to claim 2 in which the foot member is downwardly urged by spring means.

4. The system according to claim 2 in which the foot member is of inverted conical shape.

References Cited

UNITED STATES PATENTS 2,595,598   5/1952   Morton _____ 239—204

ALLEN N. KNOWLES, *Primary Examiner.*

HOWARD NATTER, *Assistant Examiner.*

U.S. Cl. X.R.

137—287; 239—204